United States Patent [19]

Barner et al.

[11] 4,044,094

[45] Aug. 23, 1977

[54] TWO-STAGE FLUID BED REDUCTION OF MANGANESE NODULES

[75] Inventors: Herbert E. Barner, Westford; David S. Davies, Andover, both of Mass.; Lester J. Szabo, Prince Edward Island, Canada

[73] Assignee: Kennecott Copper Corporation, New York, N.Y.

[21] Appl. No.: 500,493

[22] Filed: Aug. 26, 1974

[51] Int. Cl.$^2$ .................. C01G 3/14; C01G 53/12; C22B 5/18
[52] U.S. Cl. .................. 423/32; 423/49; 423/150; 423/DIG. 4; 75/21; 75/26; 75/72; 75/80; 75/82; 75/103; 75/117; 75/119
[58] Field of Search .................. 75/1, 21, 26, 72, 80, 75/82, 103, 117, 119, 121; 423/32, 33, 24, 150, 49, 139

[56] References Cited

U.S. PATENT DOCUMENTS

| | | | |
|---|---|---|---|
| 1,349,322 | 8/1920 | Clevenger et al. | 75/21 |
| 2,310,258 | 2/1943 | Riveroll | 75/80 |
| 2,481,217 | 9/1949 | Hemminger | 75/26 |
| 3,246,978 | 4/1966 | Porter | 75/26 |
| 3,375,097 | 3/1968 | Welsh | 423/49 |
| 3,471,285 | 10/1969 | Rolf | 75/103 |
| 3,615,340 | 10/1971 | Fuqua | 75/26 |
| 3,644,114 | 2/1972 | Vosahlova | 423/150 |
| 3,714,326 | 1/1973 | Matson | 423/150 |
| 3,734,715 | 5/1973 | Redman | 75/103 |
| 3,736,125 | 5/1973 | Wilder | 75/103 |
| 3,751,554 | 8/1973 | Bare et al. | 423/150 |
| 3,753,686 | 8/1973 | Wilder et al. | 75/103 |
| 3,860,689 | 1/1975 | Sefton | 423/150 |

*Primary Examiner*—O. R. Vertiz
*Assistant Examiner*—Brian E. Hearn
*Attorney, Agent, or Firm*—Anthony M. Lorusso; John L. Sniado

[57] ABSTRACT

Process in which manganese nodules are treated to enable metal values to be recovered. Manganese ore nodules are treated in a two-stage fluid bed process to produce a leachable product. In the first stage, dried nodules are calcined using direct fuel injection under a neutral or slightly oxidizing atmosphere to remove about one-half of the oxygen content. Subsequently, in the second stage, the calcined nodules are reduced with synthesis gas to render the metal values leachable. The metal values such as copper and nickel are leached from the reduced nodules with an ammonia-ammonium carbonate leach solution.

48 Claims, 10 Drawings

COOLING CIRCUIT

FIRST STAGE LEACH

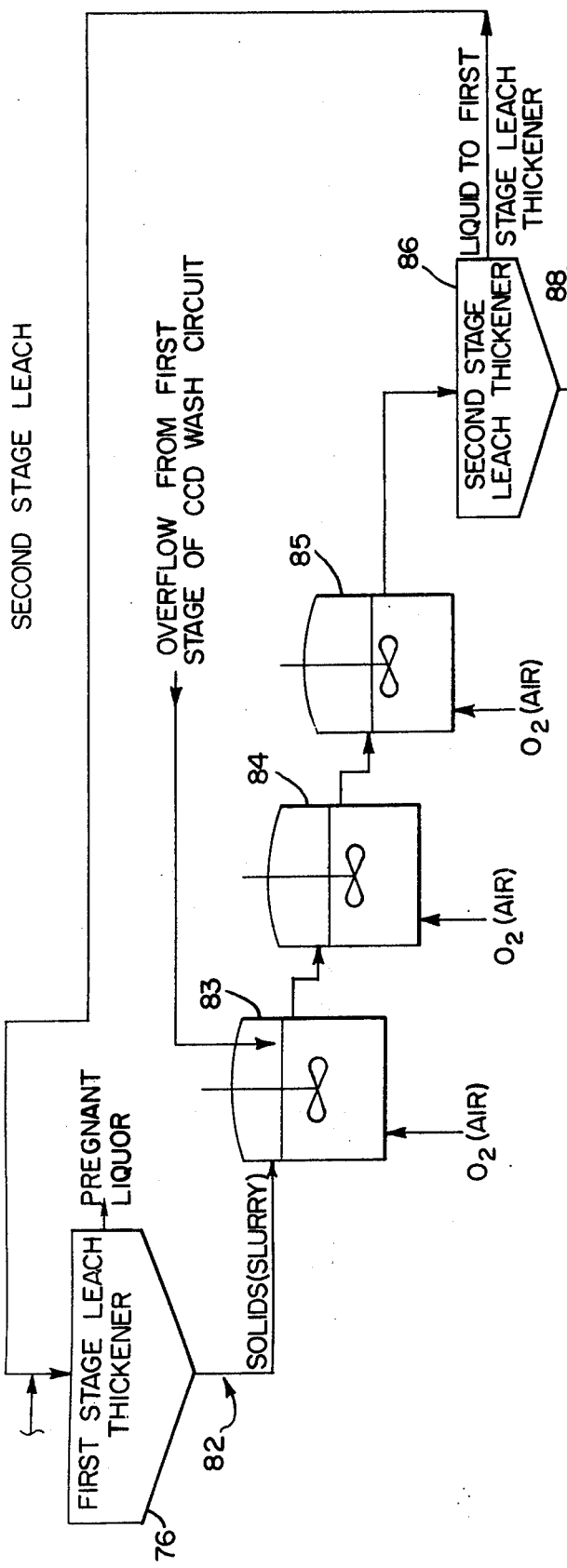
FIG. 9. SECOND STAGE LEACH
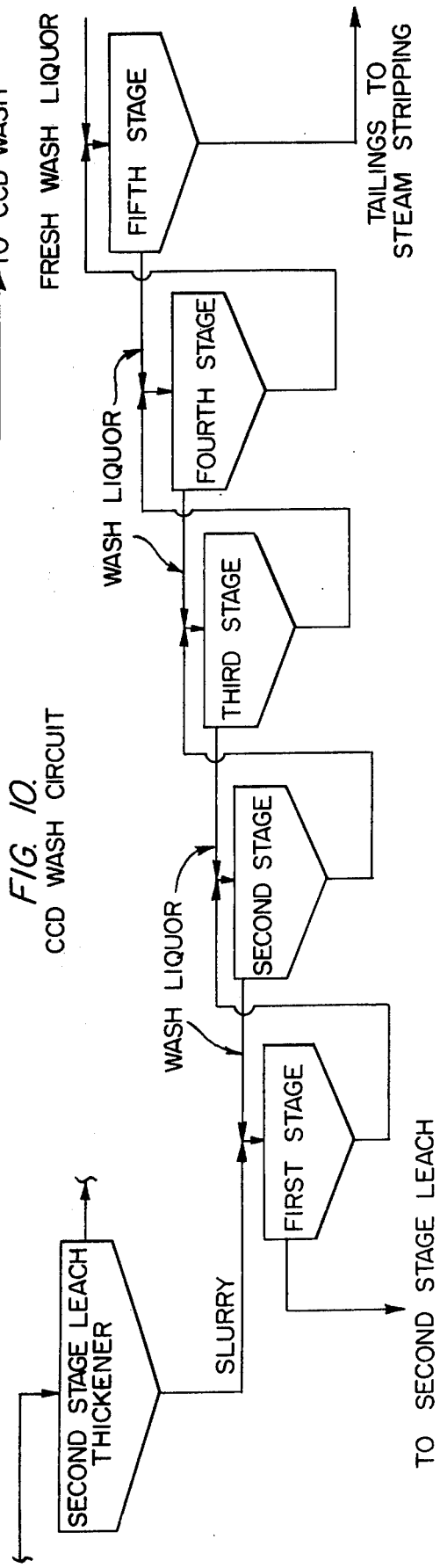
FIG. 10. CCD WASH CIRCUIT

TWO-STAGE FLUID BED REDUCTION OF MANGANESE NODULES

BACKGROUND OF THE INVENTION

The initial recovery of base metal values from deep-sea manganese ore nodules mined from the ocean floor has prompted a search for efficient methods of extracting the valuable metal values which are entrapped by large quantities of manganese.

In order to render the deep-sea nodules leachable, the manganese dioxide ($MnO_2$) in the nodules must be broken down so that the leach liquor can reach the metal values of interest. One known method of breaking down the manganese dioxide is reduction. Indeed, several reduction schemes have been developed, one of which is a single stage fluid bed reduction scheme.

In the single stage fluid bed reduction process, Bunker C oil is partially combusted with air to provide the fluidizing gas and a reducing atmosphere. A disadvantage of this method is poor fuel gasification and excessive carbon deposition at the operating conditions required to reduce nodules. The use of ore pre-soaked with oil is also unexceptable for the same reasons.

A gas reduction route essentially free of carbon deposition is known; however, the cost of the reducing gas required for this scheme renders it economically unexceptable.

SUMMARY OF THE INVENTION

In accordance with the present invention, prior to being reduced, the nodules are calcined in a fluid bed reactor under process conditions which remove about one-half of the oxygen present in the nodules. The calcined nodules are subsequently reduced in a second stage fluid bed.

In the first stage of the two stage process, the manganese dioxide readily decomposes to $Mn_2O_3$ and $Mn_3O_4$. This reaction is an attractive one for a fluid-bed operation using direct fuel injection because the process can be carried out in an oxidizing atmosphere where carbon formation is negligible. Furthermore, far less reducing gas is required in the reduction stage when the material being reduced in $Mn_2O_3$ or $Mn_3O_4$.

Accordingly, it is an object of the present invention to provide an economical process for treating deep sea nodules to render the base metal values contained therein leachable.

Another object of the invention is to provide a new and improved process for solubilizing metal values in manganese nodules.

A further object of the invention is to provide a novel method for reducing manganese nodules.

Still another object of the invention is to provide a method of reducing manganese nodules in a fluid bed in which the problem of carbon formation is minimized.

Another object of the invention is to provide a method of reducing nodules with a reducing gas in which the amount of reducing gas required is lowered.

Another object of the invention is to provide a two-stage fluid bed process for the reduction of base metal bearing manganese ores in which the ore is first calcined to remove some of the oxygen content of the ore and is then reduced to enable the base metal values to be leached in an ammonia-ammonium carbonate leach solution.

BRIEF DESCRIPTION OF THE DRAWING

FIGS. 7-10 is a flow sheet illustrating the process of the present invention.

DESCRIPTION OF THE PREFERRED EMBODIMENT

Figure 1:
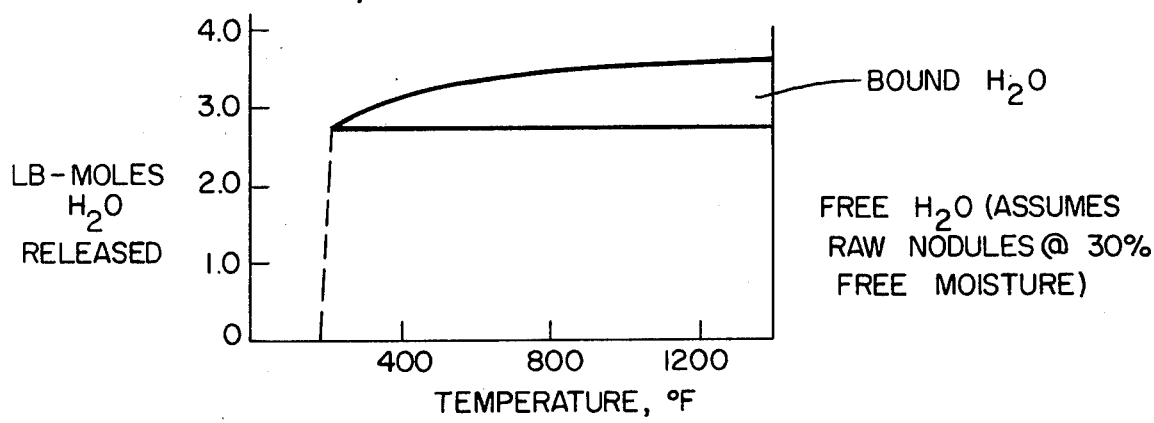
FIG. 1 is a graph illustrating the water profile of nodules.

The present invention is directed to the recovery of metal values from manganese deep sea nodules. For the purpose of this patent specification and claims, complex ores which are found on the deep sea floor of oceans and lakes containing manganese, iron, copper, nickel, molybdenum, cobalt and other metal values are variously referred to as deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127-241 various aspects of manganese nodules. For a detailed chemical analysis of nodules from the Pacific Ocean see pages 449 and 450 in the Encyclopedia of Oceanography, edited by R. W. Fairbridge, Reinhold Publishing Corp., N.Y. 1966, and U.S. Pat. No. 3,169,856. For the purpose of this invention the complex ores will be considered as containing the following approximate metal content range on a dry basis:

| METAL CONTENT ANALYSIS RANGE | | |
| --- | --- | --- |
| Copper | 0.8 - | 1.8% |
| Nickel | 1.0 - | 2.0% |
| Cobalt | 0.1 - | 0.5% |
| Molybdenum | 0.03 - | 0.1% |
| Manganese | 10.0 - | 40.0% |
| Iron | 4.0 - | 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores. Definitions of other terms used throughout this specification and/or claims appear in the glossary below.

GLOSSARY available oxygen (%):

Oxygen liberated from nodule sample by reduction with pure hydrogen at 750° C, expressed in weight %.

bone-dry ore:

Actual nodule ore minus free and combined (bound) moisture content (complete removal of bound moisture requires drying at 800° C).

chemical utilization (%):

A measure of the CO and $H_2$ utilized in the reduction stage, defined by:

$$\frac{\text{Lb-atoms oxygen liberated/100 lb bone-dry feed}}{\text{Equivalent reductant feed ratio}} \times 100$$

equivalent reductant feed ratio:

A measure of reducing gas supplied per unit of ore feed, equivalent to lb-moles of pure CO + $H_2$ per 100 lb bone-dry ore. The $H_2O$ and $CO_2$ content of the actual feed gas is counted as $H_2$ and CO, but the corresponding ore feed is increased to account for the oxygen loading ($CO_2$ versus CO and $H_2O$ versus $H_2$) of the feed gas. The ratio is precisely defined as $100\ Y/X$ where:

$Y = H + QS/(S+W)$
$X = A + Q(S+W)$
$A$ = lb/min of bone-dry ore feed
$H$ = lb-mole ($H_2$ CO)/min in feed gas
$Q$ = lb-mole ($CO_2 + H_2O$)/min in feed gas
$S$ = lb-atom oxygen liberated from ore/lb bone-dry ore
$W$ = lb-mole of (initial) $H_2O$ liberated/lb bone-dry ore leachability (%):

$$\frac{\text{Metal extracted from calcine sample}}{\text{Metal content of calcine sample}} \times 100$$

reduction (%):

$$\frac{\text{Oxygen removed in reduction}}{\text{Total oxygen available for reduction}} \times 100$$

space velocity:

Superficial gas velocity (measured on an empty tube basis) through fluid bed, ft/sec.

Figure 2:
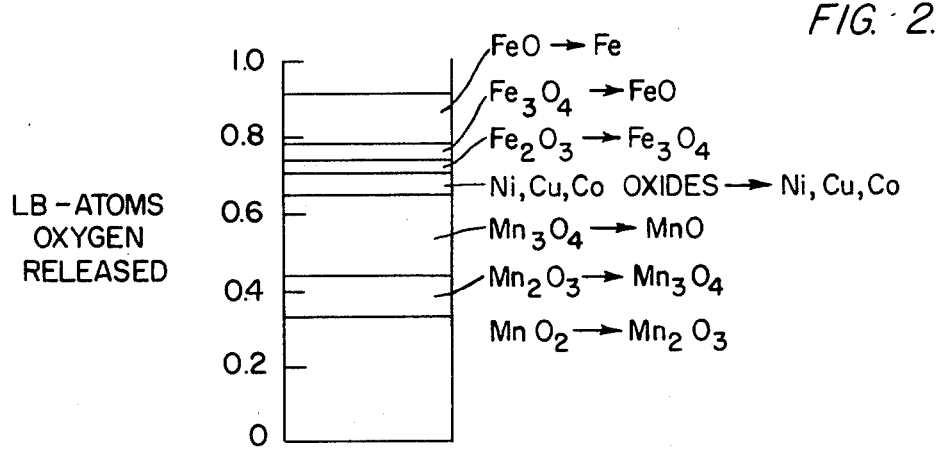
FIG. 2 is a diagram illustrating the "available oxygen" profile of nodules.

In order to remove metal values such as copper, nickel, cobalt and molybdenum from manganese nodules, it is advantageous to reduce the nodules. Stated another way, a percentage of oxygen in the nodules should be removed. The available oxygen calculated from assumed stoichiometry and available water data given in FIGS. 1 and 2 are useful for assessing drying and oxygen removal loads associated with nodule ore. It should be noted that in addition to the bound water the nodules arrive at a processing plant with approximately 30%–45% free moisture. Most of the free moisture is removed by physical separation followed by a drying step.

In the present process, combined moisture and a significant portion of the oxygen are removed by calcining the ore under oxidizing conditions. The oxygen release is possible because manganese dioxide is unstable and decomposes to $Mn_2O_3$ at moderate temperatures. Indeed $MnO_2$ is the least stable oxide of manganese shown in FIG. 2 with a dissociation pressure of approximately 1 atm. at 1000° F. The equilibrium oxygen pressure for $Mn_2O_3$ decomposition (to form $Mn_3O_4$) is much lower — only about 0.002 atm. at 1350° F.

Experimental results have shown that approximately 0.7 lb. atoms of oxygen per 100 lb. of bone-dry feed must be removed to obtain a leachable calcine. Excess removal of oxygen as well as insufficient removal of oxygen impedes later leachability of the ore so that control of the reduction reactions to a specific degree is necessary. FIG. 2 shows the source of available oxygen and the reduction reactions necessary to achieve the oxygen removal.

Figure 3:
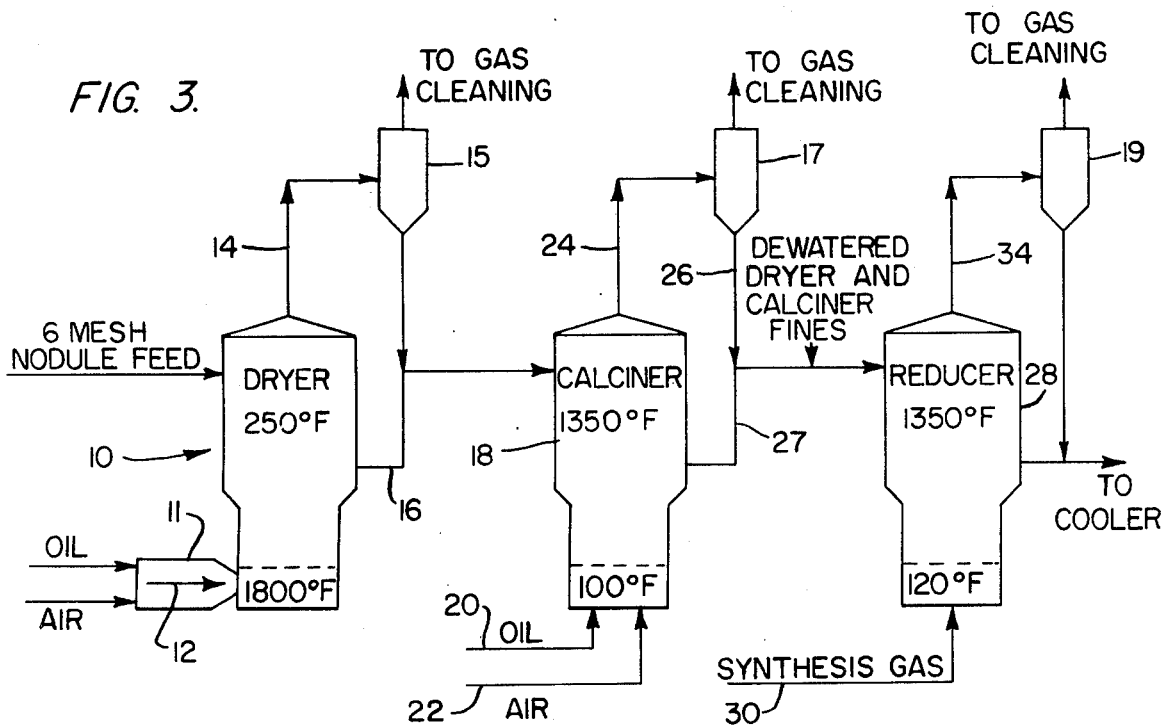
FIG. 3 is a flow sheet illustrating the process of the present invention.

The process of the present invention which effects the necessary oxygen removal may be more fully understood by reference to the process flowsheet in FIG. 3. At the outset, the process is described in its broader overall aspect with a more detailed description following.

Nodules as received from the ocean floor are physically dewatered and are prepared for processing by first grinding to 6 mesh (U.S. Sieve size). The ore, containing approximately 30% free water and 10% combined (bound) water, is then dried in fluid bed dryer 10 at 250° F. Hot fluidizing gas 12 enters from the bottom 11 of dryer 10 and exits at the top of the dryer as is shown by arrow 14. Product is discharged partly as underflow 16 which proceeds to calciner 18 and partly as carryover in the off gases represented by arrow 14. After leaving the dryer, the fluidizing gas containing entrained solids enters cyclone 15 where solids are separated and are combined with stream 16 entering calciner 18. The off gas from cyclone 15 is sent to a gas cleaning circuit. Fines are recovered in a gas scrubber system and the fines are separated by solid-liquid separation.

The dryer product has a total moisture content of about 18%, including essentially all of the combined water. The material may be stored in a surge bin for introduction at the proper rate into a calciner 18.

In calciner 18, the dryer product is calcined at 1250° F to remove the remaining free and combined water. In addition, the calciner 18 readily decomposes the manganese dioxide according to the reaction

$$2MnO_2 \rightarrow Mn_2O_3 + \tfrac{1}{2}O_2$$

At 1350° F and oxygen partial pressures of 0 to 0.07 atm., about 60% of the $Mn_2O_3$ is converted to $Mn_3O_4$. In the process of the present invention, the $MnO_2$ is converted to intermediate oxides. Such oxides include $Mn_2O_3$, $Mn_3O_4$ and $Mn_5O_8$. It is not certain as to which of these intermediate oxides predominate.

The required heat for calcination is provided by directly injecting and combusting Bunker C fuel oil 20 in the fluid bed using sufficient air 22 to maintain an oxygen content of approximately 6% by weight in the stack gases 24. This level of oxygen is recommended to insure efficient combustion of oil with minimum carbon formation. Other fuels such as natural gas can be used for this step. As was the case with dryer 10, the carryover in the stack gases 24 is removed when the off gas is passed through cyclone 17 and a scrubber for recovery of fines. The separated solid carryover 26 is then added to the hot calcined underflow 27 which flows to the fluid bed reducer 28. Dewatered dryer and calciner fines are also added to reducer 28.

In the reducer 28, the intermediate manganese oxides are reduced at 1350° F to MnO and the Cu, Ni and Co oxides are reduced to their elemental states. It is emphasized that the terminal manganese reduction product below about 2000° F is MnO. The gas 30 for fluidization and reduction is synthesis gas which analyzes about 42.0% CO, 37.8% $H_2$, 12.3% $N_2$, 5.7% $H_2O$ and 2.2% $CO_2$. Of course other gases such as hydrogen can be used in this step. The gas may be generated in a synthesis gas plant by partial oxidation of Bunker C fuel oil using oxygen enriched air (60% $O_2$). Other fuels such as natural gas or coal can be used for reducing gas production. The gas is scrubbed to remove particulate carbon and is delivered cold (120° F) to the reactor windbox.

The reduction reactions in the reducer 28 are exothermic and, therefore, provide the source of heat to heat the gas 30. At this point, it should be noted that the reduction temperature is an important parameter in the process. At temperatures above 1350° F, nickel recovery is affected, that is when the nodules are subjected to temperatures above 1350° F; leachability of the nickel from the ore becomes more difficult. If exothermal heat exceeds that necessary for the reduction stage then some means of utilizing the excess heat can be included in the process. This can be accomplished by by-passing a portion of the dryer product directly to the reducer. Alternatively the reducer may be permitted to operate at temperatures of 200° F in excess of the calciner. The preferred alternative to accomplish the heat balance, however, is to forward scrubber fines from the dryer and calciner directly to the reducer.

Once again the reducer carryover fines in the offgas 34 are captured by a cyclone 19. The cyclone offgas goes to wet scrubbing and the remaining fines are subsequently recovered. The reduced calcine leaves the reducer 28 and proceeds to a cooler 60 where the temperature is diminished to 500° F in a fluid bed using nitrogen as the fluidizing gas (see FIG. 7). The cooler 60 contains coils 62 in which water is converted to steam thereby lowering the temperature of the reduced ore from 1350° F to 500° F. The cooler off gas is cleaned through a cyclone (not shown) followed by a scrubber 64 and is recycled back to the cooler 60. After leaving the cooler, the nodules have been treated sufficiently to enable the metal values to be leached. Thus, the foregoing constitutes a general overall description of the process for producing a leachable calcine; a more detailed description, along with a scheme for recovering metals from the leached calcine follows.

The nodule ore input to a plant consists of 200 short tons per hour (TPH) of wet manganese nodules. Ore feed preparation consists of size reduction of the nodules to minus 6 mesh by use of single and double cage mills. The prepared ore feed which contains approximately 30% free moisture and 10% combined moisture is dried in a dryer at a fluid bed temperature of 250° F. The product from the dryer has a total moisture content of about 18%, including essentially all of the combined moisture in the nodules. The dryer product, about 143 TPH is stored in a surge bin of about 500 tons capacity to provide approximately 4 hours of ore feed supply. Each 297,003 lbs per hour of feed entering the dryer includes 239,000 lbs per hour of solids, 39,000 lbs per hour of combined water and 119,00 lbs per hour of free water. In order to process the foregoing amount of nodule feed, 9,384 lbs per hour of oil are mixed with 330,933 lbs per hour of air in the dryer. The space velocity within the dryer is 8 feet per second, 444,808 lbs per hour of off gas leave the dryer. The nodules are retained in the dryer for approximately 7 minutes before being forwarded to the calciner. The product distribution from the dryer is as follows:

| Underflow | 74.4% |
|---|---|
| Primary cyclone | 23.1% |
| Secondary cyclone | 2.0% |
| Scrubber fines | 0.5% |

The nodules entered the dryer containing 29% free water content and exits with about 8% free water content. Total bound and free are water at the exit of the dryer is about 18%.

After leaving the dryer, approximately 292,875 lbs per hour of dryer product is introduced into the fluid bed calciner. The operation in the calciner is the calcination of the dry manganese nodules to remove the remaining free and combined water, to decompose the manganese oxides to lower oxides, and to preheat the ore for the next processing step. This calcination operation is carried out in a fluid bed calciner at a fluid bed temperature of 1350° F and at a space velocity of about 4 feet per second. The required heat is supplied by injection and combuston of Bunker-C oil directly in the fluid bed. In the calcination operation, the $MnO_2$ in the nodules will react to form principally $Mn_2O_3$ and $O_2$

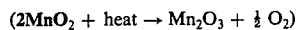

About 60% of the $Mn_2O_3$ is also converted to $Mn_3O_4$. The heat required for calcination is provided by injecting and combusting Bunker-C oil in the fluid bed using sufficient air to maintain an oxygen content of approximately 6% weight in the off gases. The average material retention time in the calciner is about 3 hours. Direct fuel injection of the Bunker-C fuel oil provides all the heat necessary for the reaction. The space velocity of the gas is 4 feet per second. To maintain the temperature within the calciner approximately 18,200 lbs per hour of Bunker-C oil are mixed with 319,412 lbs per hour of air.

The total water content is reduced in the calciner to less than 10% by weight. The product distribution from the calciner is given in the following table.

| Underflow | 47.6% |
|---|---|
| Primary cyclone | 46.1% |
| Secondary cyclone | 4.6% |
| Scrubber fines | 1.7% |

Available oxygen is reduced in the calciner from 11.9 weight percent in the feed to 9.3 weight percent in the underflow. The slight oxidizing atmosphere maintained by injecting sufficient air to allow 6% oxygen in the offgas, allowed good gasification and resulted in a carbon content of only 0.02 weight percent in the product.

The hot calcined ore from the calciner flows by gravity to a fluid bed reducer. Centrifuge cake from calciner and dryer scrubbers is also added to the ore reducer. Slight changes in centrifuge cake moisture, calciner bed operating temperature and reducing gas temperature can be used as a means for controlling reduction bed temperature.

The ore reduction is carried out in a fluid bed reducer operating at 1350° F and at a space velocity of about 4 feet per second. Gas for fluidization and reduction is generated from Bunker-C oil and has an analyses of about 5.7% $H_2O$, 42% CO, 37.8% $H_2$, 2.2% $CO_2$ and 12.3% $N_2$ (% by volume). This gas is a cool clean gas which is delivered to the reducer windbox at about 120°

F. The exhaust gas from the reducer goes to a cyclone dust collecting system and then a wet gas scrubber-cooler.

The fine reduced fractions discharged as cyclone product is collected in a seal tank for subsequent transfer to the cooler. In the reducer the $Mn_2O_3$ in the hot calcined ore is reduced to MnO. Higher oxides of Mn in the centrifuge cake are also reduced to MnO by $H_2$ and CO in reducer gas. Reduction bed temperature is controlled as above and by addition of small amounts of bed spray water.

Approximately 38,667 lbs per hour of synthesis gas are introduced into the reducer. The space velocity in the reducer is 4 feet per second.

The scruber offgas exits at the rate of approximately 50,320 lbs per hour. In the reducer, the higher oxides of manganese are reduced to MnO. The $Fe_2O_3$ is converted to $Fe_3O_4$ and the base metal oxides are reduced to their elemental forms ($CuO \rightarrow CU$). Approximately 211,007 tons per hour of reduced product are removed from the reducer.

The temperature of the bed is held at 1350° while the material residence time averages 1 hour. Available oxygen is reduced from 9.6% to 2.8% by weight in the underflow.

Figure 7:
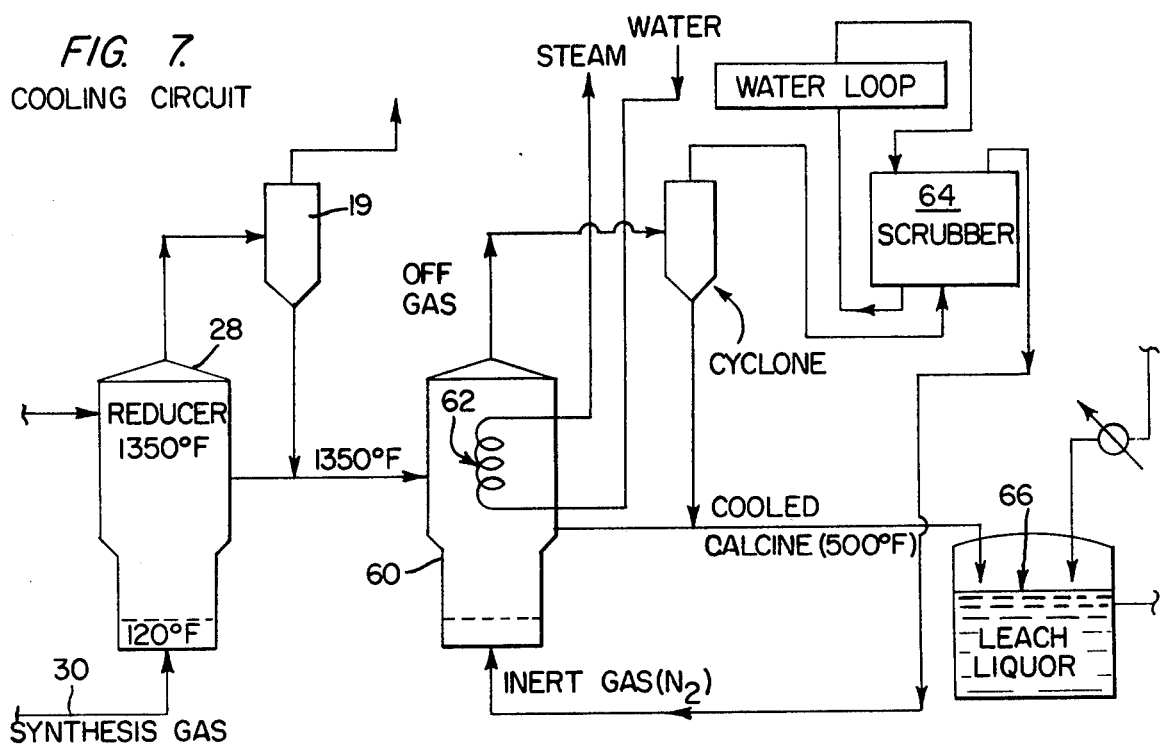

As is shown in FIG. 7, the reduced ore leaving cooler 60 is quenched in ammonia-ammonium carbonate leach liquor 66 solution. Extractions of 90% copper and 90% nickel are possible with liquor 66 containing 100 g/l $NH_3$ and 60 g/l $CO_2$. Thus, the cooled calcine from reduced ore cooler 60 discharges directly into a quench tank 66 where it is quenched with $CO_2$-rich recycle leach solution. The tank 66 is covered and provided with facilities for the introduction of inert gas if such anti-oxidation is needed.

The system is designed to handle a calcine output of 106 tons per hour from the cooler 60.

The reduced calcine contains about 40% manganese. Some 70% of this manganese is expected to be converted to manganese carbonate when the calcine is mixed with the ammonia/carbon dioxide leach solution. Since the manganese carbonation reaction proceeds fairly rapidly, it is desirable to have all the carbon dioxide required available in the recycle leach solution used for quenching.

Figure 8:
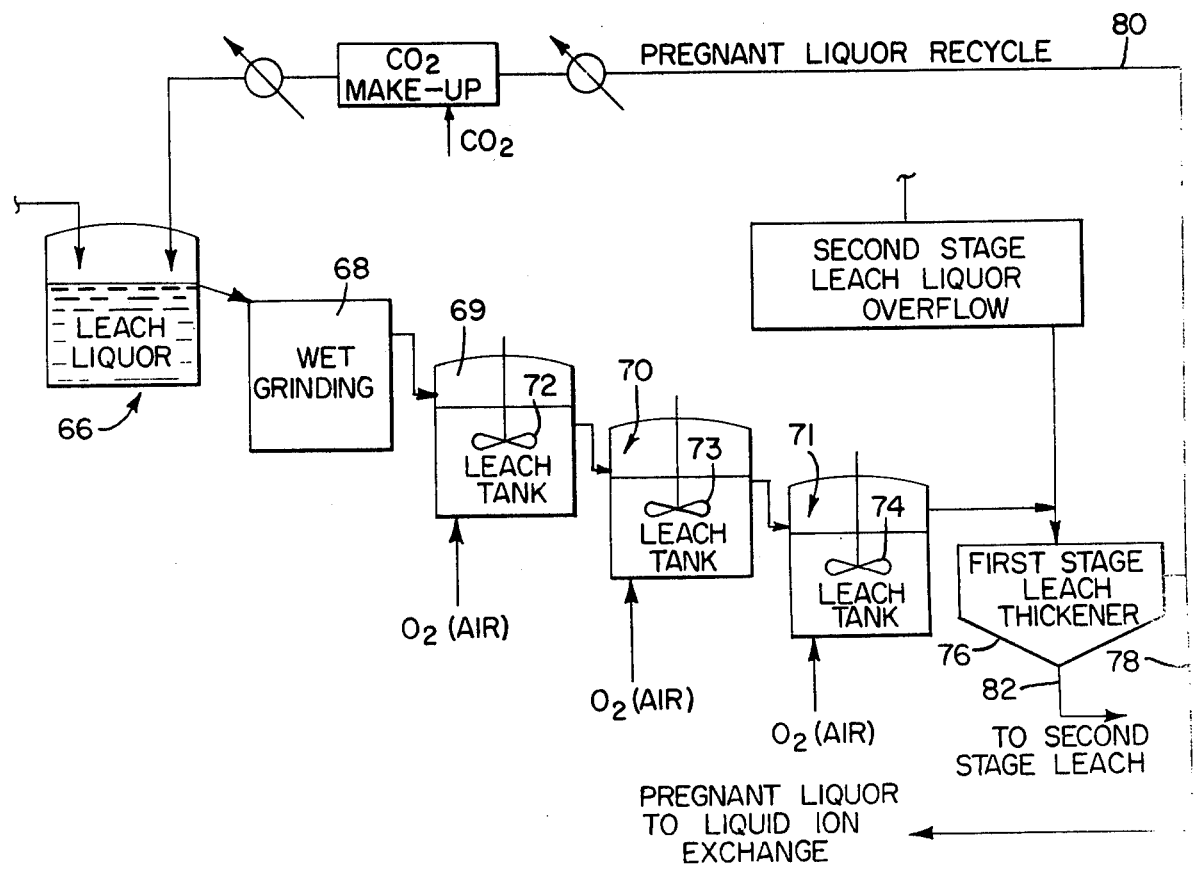

Calcine particle size is expected to be 100% passing 6 to 10 Tyler mesh. It has been established that good metal extractions can be obtained if the calcine particle size is reduced to 100% passing 35 Tyler mesh. A grinding circit 68 is provided to accomplish the foregoing (see FIG. 8).

Grinding is carried out in a pebble mill. Granite or flint pebbles are used as grinding media.

The operating pebble mill functions in closed circit with the bank of rubber-lined cyclones (not shown). These cyclones are sized to give a 35 Tyler mesh separation with feed and underflow densities of 23 and 50% solids by weight respectively.

The ground calcine is leached, in two, countercurrent stages, using a lixiviant containing 100 grams per liter of ammonia and 65 grams per liter of carbon dioxide with air as an oxidant.

The overflow from the cyclones flows, to the first stage leach, which is carried in three tanks 69, 70, 71 operating in series. These tanks are sized to give retention time of one hour with a pulp density of just under 10% solids. The pulps are held in suspension by multiple-bladed, turbine-type impeller 72,73,74. The impellers also serve to disperse the air which will be introduced into each of the tanks below the impeller blades. The purpose of the air is to oxidize the metals to be recovered.

The leached pulp flows by gravity from the third tank 71 to a thickener 76 for separation of the solids and liquid. The thickener overflow (leach) solution contains 20 grams per liter of metals. The overflow 78 (the pregnant solution) is sent to metal recovery; a portion 80 is also recycled to the carbon dioxide absorption and quenching operations. The solids 82 is withdrawn from the bottom of the thickener 76 as a pulp containing 45% solids, and pumped to the second stage leach.

The feed to the second stage leach (see FIG. 9) consists of the underflow pulp from the first leach thickener 76, the overflow from the first wash thickener, and sufficient recycle second leach solution to give a pulp density of 16% solids. The leach is carried out in three tanks 83, 84, 85 which are sized to give a retention time of one hour. The pulps are held in suspension by multiple-bladed, turbine-type impellers. The impellers also serve to disperse additional oxidation air which is introduced into each tank below the impeller blade.

The pulp discharged from the second leach is pumped to a second thickener 86 for solids-liquid separation. Part of the thickener overflow is recycled to the leach, and the balance joins the first leach solution going to carbon dioxide absorption. The thickener underflow is pumped at 45% solids to the washing circuit.

The pregnant solution overflowed from the first thickener contains some 50 parts per million of very fine solids. These solids must be removed before the pregnant liquor enters solvent extraction because they will cause interface "crud" formation. The solids are removed by passing the pregnant liquor through pessurized, upflow sand filters. The clarified pregnant liquor contains less than one part per million of solids.

The underflow from the second leach thickener is washed for metals recovery in a conventional, 5 stage countercurrent-decantation (CCD) thickener circit (see FIG. 10). In order to ensure good diffusion of the wash solutions into the pores of the coarser solids particles, provision is made for pre-mixing the feed to each thickener in an agitated tank. The wash liquor contains 100 g/l $NH_3$ and 65 g/l $CO_2$.

Material balances for the drying, calcining and reducing steps of the process are set forth in Tables A, B and C below:

TABLE A

| STREAM lbs/hr COMPONENT | Drying | | | | | |
|---|---|---|---|---|---|---|
| | Raw Noduls | Air to Dryer | Oil to Dryer | Dryer Off Gas | Scrubber Off Gas | Dried Nodules |
| Solids | 239,000 | | | | | 239,000 |
| $H_2O$ (Comb.) | 39,000 | | | | | 39,000 |
| $H_2O$ (Free) | 119,000 | | | 112,067 | 16,800 | 14,667 |
| $O_2$ | | 77,600 | | 48,775 | 48,775 | |
| $N_2$ | | 253,333 | | 253,333 | 253,333 | |
| $CO_2$ | | | | 30,000 | 30,000 | |

TABLE A-continued

Drying

| STREAM lbs/hr COMPONENT | Raw Noduls | Air to Dryer | Oil to Dryer | Dryer Off Gas | Scrubber Off Gas | Dried Nodules |
|---|---|---|---|---|---|---|
| $H_2$ | | | | | | |
| Fuel | | | 9,067 | | | |
| S | | | 317 | | | 158 |
| $SO_2$ | | | | 633 | 633 | |
| Total | 397,033 | 330,933 | 9,384 | 444,808 | 349,541 | 292,015 |
| M.W. (molecular wt.) | | 29 | | 25.4 | 28.6 | |
| S.C.F.H. | | 4,324,893 | | 6,628,467 | 4,630,000 | |
| % Solids | 70 | | | | | 95 |
| °F | AMB. | AMB. | 200 | 220 | 110 | |

TABLE B

Calcining

| STREAM lbs/hr COMPONENT | Calciner Feed | Air to Calciner | Oil to Calciner | Calciner Off Gas | Scrubber Off Gas | Gas to $CO_2$ abs. | Calciner Product |
|---|---|---|---|---|---|---|---|
| Solids | 239,000 | | | | | | 228,207 |
| $H_2O$ (Comb.) | 39,000 | | | | | | |
| $H_2O$ (Free) | 14,667 | | | 68,773 | 13,410 | 3,450 | |
| $O_2$ | | 73,442 | | 30,727 | 30,727 | 8,100 | |
| $N_2$ | | 245,970 | | 245,970 | 245,970 | 64,000 | |
| $CO_2$ | | | | 55,553 | 55,553 | 14,607 | |
| $H_2$ | | | | | | | |
| Fuel | | | 17,597 | | | | |
| S | 158 | | 603 | | | | |
| $SO_2$ | | | | 1,207 | 1,207 | | |
| Total | 292,825 | 319,412 | 18,200 | 402,230 | 346,867 | 90,157 | 228,207 |
| M.W. | | 29 | | 27.0 | 29.5 | 29.1 | |
| S.C.F.H. | | 4,181,000 | | 5,636,000 | 4,468,400 | 1,176,253 | |
| % Solids | 95 | | | | | | 100 |
| °F | 180 | AMB. | 190 | 1,250 | 110 | 110 | 1.350 |

TABLE C

Reduction

| STREAM lbs/hr COMPONENT | Reducer Feed | Reducing Gas | Scrubber Off Gas | Reducer Product |
|---|---|---|---|---|
| Solids | 228,207 | | | 211,007 |
| $H_2O$ (Comb.) | | | | |
| $H_2O$ (Free) | | 2,207 | 3,620 | |
| $O_2$ | | | | |
| $N_2$ | | 7,433 | 7,433 | |
| $CO_2$ | | 2,100 | 32,970 | |
| CO | | 25,283 | 5,750 | |
| $H_2$ | | 1,643 | 727 | |
| Fuel | | | | |
| S | | | | |
| $SO_2$ | | | | |
| Total | 228,207 | 38,667 | 50,320 | 211,007 |
| M.W. | | 17.9 | 28.3 | |
| S.C.F.H. | | | | |
| % Solids | 100 | | | 100 |
| °F | 1,350 | 170–150 | 110 | 1,350 |

The pregnant liquor 78 (see FIG. 8) contains various metal values including copper, nickel, cobalt and molybdenum. In the liquid ion exchange separation circuit (not shown), the object is to separate the copper, nickel, cobalt and molybdenum from each other and from the pegnant liquor. Initially, the copper and nickel are coextracted by an organic extractant in a series of mixer/settler units. The organic extractant is LIX-64N in kerosene base. LIX-64N is an extractant sold be General Mills Chemical, Inc.

The copper and nickel free liquor (raffinate) is sent to a storage tank before it is steam stripped.

The organic extractant which contains copper and nickel values is washed with an $NH_4HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains only cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate thereby precipitating cobalt. The ammonia and $CO_2$ are condensed and sent back to the process for recycling. The cobalt precipitate is separated from the liquor and the liquor is subsequently treated with hydrated lime to precipitate the molybdenum. The resulting slurry is agitated and then allowed to settle. The solution which no longer contains cobalt and molybdenum is recycled back to the process as fresh wash liquor. Ammonia and $CO_2$ are added to the solution to bring it up to the prescribed concentration. For further details of a liquid ion exchange procedure which can be employed see U.S. application Ser. No. 266,985, entitled Selective Stripping Process by Roald R. Skarbo, filed June 28, 1972, the teachings of which are incorporated herein by reference.

Metal recovery is accomplished by electrowinning copper and nickel from the solutions prepared in the LIX plant as described above. The process is performed on a batch basis for the copper recovery and on a continuous basis for the nickel recovery in a separate plant. The metal containing solutions are transferred once a day.

In order to evaluate the process of the present invention, nodules were treated in accordance with the present invention in a pilot plant. From the results obtained in the pilot plant, extrapolations were made to provide the parameters for a commercial plant for processing nodules in accordance with the present invention.

Figure 4:
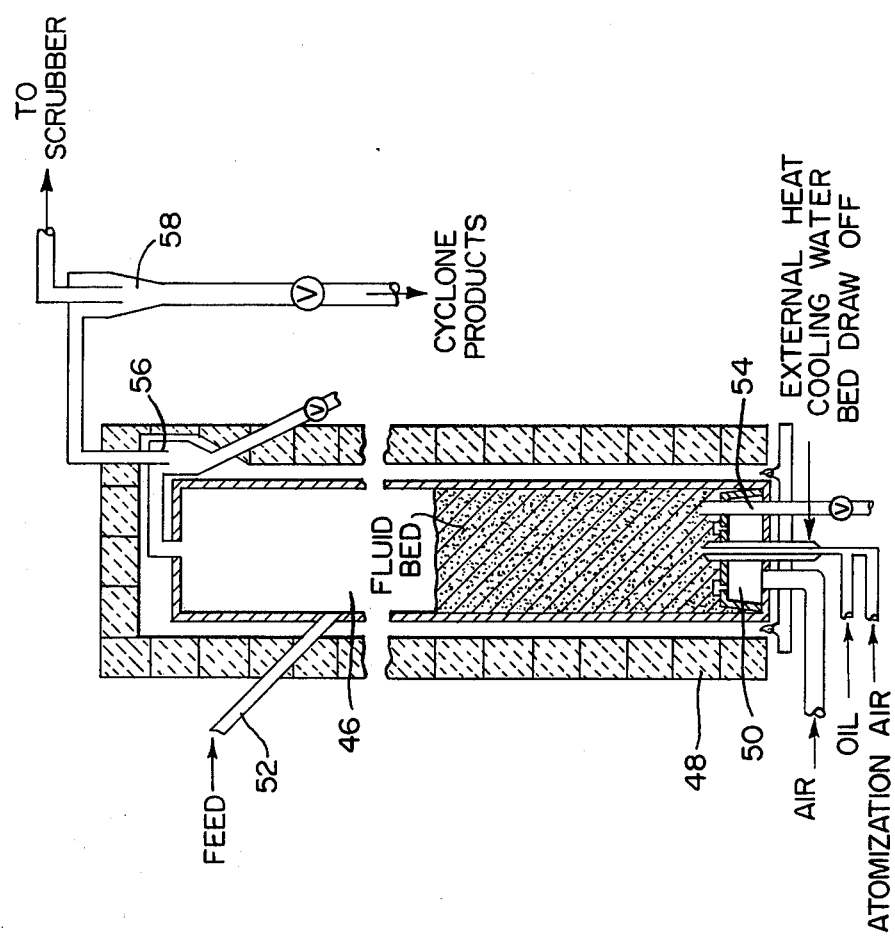
FIG. 4 is a cross-sectional view of a fluid bed dryer unit.

The drying test was made in the experimental dryer shown in FIG. 4. The test unit consists of a 12-inch diameter insulated stainless steel tube 38 which is nine feet high mounted upon a refractory-lined air heater 40. Hot fluidizing gas was produced from the combustion of propane with air. The gas was evenly distributed into the dryer by a tuyere containing constriction plate 42. Gas flows were measured by rotameters and ore was metered by a table feeder. Material entered the bed at port 44 above the bed.

Product was discharged partly as underflow from a pipe 46 located inside the bed at the constriction plate level, and partly as carryover which was collected in dust handling system consisting of a primary and secondary cyclone and a gas scrubber. Underflow product was collected in open containers. Temperatures were measured by thermocouples, and pressures by manometers.

One pass through a Jacobson crusher and Stedman 18-inch cage mill was used to crush raw nodules to $-\frac{1}{4}$ inch.

The air heater 40 was preheated to its operating temperature (1800° F) and a starting bed of material was charged. When the bed reached desired depth (2 ft) and temperature (250° F) the unit was operated at conditions for a time equivalent to more than three bed changes before formal products were collected. (Over 95% of the starting bed inventory of full backmixed reactor would be displaced under these conditions.) The dryer was operated at conditions for a time sufficient to collect the necessary representative material for subsequent calcination and reduction tests.

Formal dryer products were coned and quartered to obtain representative samples for analysis. These were examined principally for their water content. Analyses for metal values, carbon, sulfur and chlorides were made for material balance purposes. Elemental analyses were also obtained for the scrubber water and collected dust. Thickening, centrifugation, and filtration tests were performed on this slurry. Size analyses were determined for feed and all products.

A summary of the operating conditions and results during the formal drying period are given in Table I. Commercial information is given for comparison.

At this point it should be noted that all percentages are weight percentages unless otherwise specified.

Table I
Summary of Dryer Operating Conditions and Results

| | Experimental | Commercial Flowsheet |
|---|---|---|
| Dryer Diameter, ft | 1 | 18 |
| Bed Temperature, ° F | 248 | 250 |
| Space Velocity, ft/sec | 7.9 | 8.0 |
| Average Retention Time, min | 6.6 | 10 |
| Bed Depth, ft | 2 | 3 |
| SCF (standard cubic feet) Combustion Products/lb Feed | 11.1 | 11.2 |
| Free Moisture Content of Feed, % | 29 | 30 |
| Free Moisture Content of Product, % | 7.5 | 5.0 |

The free moisture content was reduced from an initial 29% to under 7.5%. There was no significant difference in the water contents of under flow and cyclone products. Carryover was 26%. Fines collected in the wet scrubber constituted 0.5% of the total product. Dust loading for the primary cyclone, secondary cyclone and scrubber were, respectively 63, 5.7, and 0.66 grains-/ACF (actual cubic feet).

Figure 5:
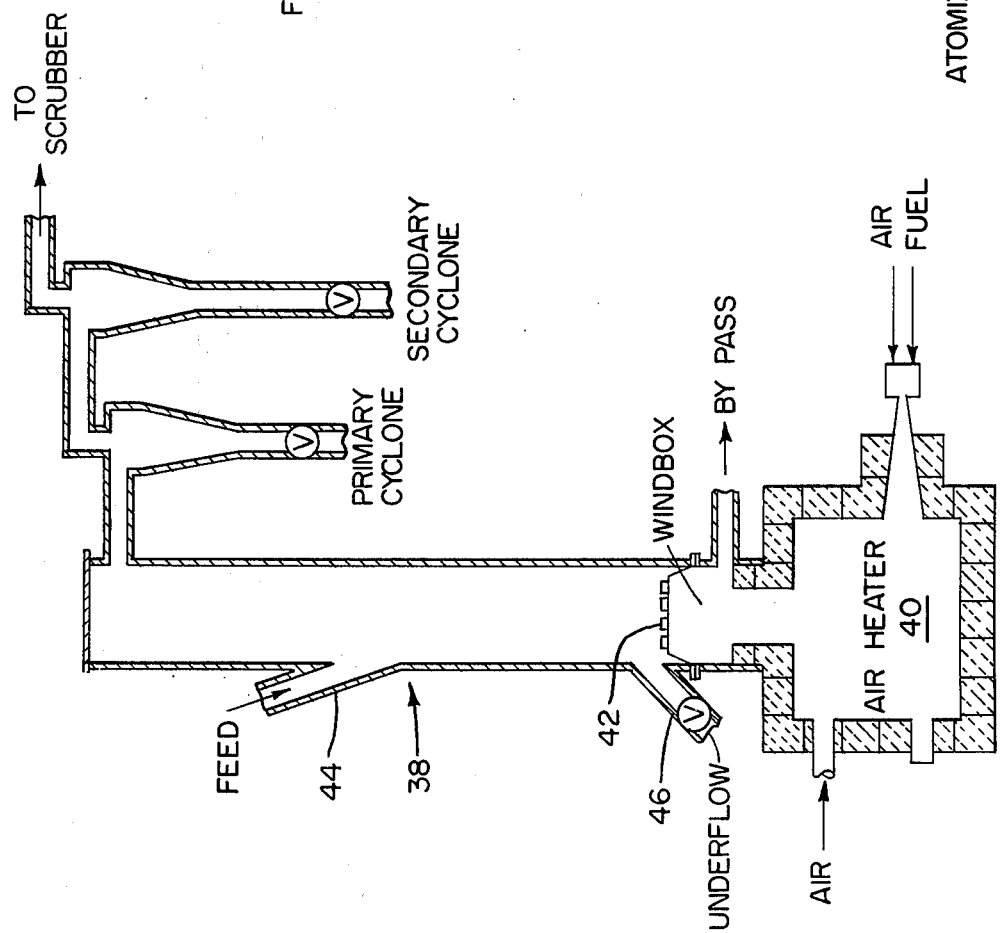
FIG. 5 is a cross-sectional view of a fluid bed reactor.

A calcining test was made in the 12 in. fluid bed reactor set forth in FIG. 5. Several other tests were run in a 4 in. fluid bed.

The reactor in FIG. 5 is a 9-foot long, 12-inch diameter, stainless steel tube 46 mounted vertically inside an insulation-type fire brick chimney 8. The tube 46 was heated by hot combustion gases generated by external burners.

Gas was metered by rotameters through inlet pipes at the bottom of the reactor. The reactor had a windbox 50 with tuyeres to distribute the gas evenly.

Oil for the calcination runs was metered by a positive displacement pump, and entered the reactor through a water-jacketed oil gun just above the bottom plate. A small amount of air was fed to the oil gun to keep the oil feeding smoothly and to keep the gun clean.

Solids were metered into the reactor by means of a pressurized screw feeder and were directed through a side feed pipe 52 that discharged above the fluidized bed.

Product was discharged partly as underflow from a bottom pipe 54 extending into the fluid bed and partly as carryover in the exit gas stream. The reactor had two cyclones and a scrubber to collect carryover. One cyclone 56 was mounted inside the brick chimney 48; the second 58 was external. All product was collected in air tight receivers previously purged with inert gas.

Samples from the calcining run were coned and quartered. Air contact was kept at a minimum.

Samples of offgas fines were collected by deflecting the offgas through a bag filter for a measured period of time. Fines were collected by wet scrubbing.

Feed for the calcination test in the fluid bed unit was produced by fluid bed drying ore as described above.

Bed depth was limited to 4-ft. in the pilot plant as compared to the projected depth of 7-ft. for the commercial unit.

Condensed summaries of the data for calcination results are given in Table II. Runs were conducted at 1350° F using 6-mesh feed except for run 47 for which $-10$ mesh feed was used.

Calcining in the commercial flowsheet is based on removing all water remaining after drying and decomposing $MnO_2$ to $Mn_2O_3$. Pilot plant results indicate water removal is complete. Calcination products consisted of mixtures of $Mn_2O_3$ and $Mn_3O_4$. The $Mn_2O_3$ →$Mn_3O_4$ decomposition reaction proceeded to 60% completion and was only mildly dependent on the oxygen content of the offgas within the range investigated.

tor shown in FIG. 5. Condensed summaries of the data for reduction results are given in Table III.

Table III

| | | Condensed Summary of Reduction Data | | | | |
|---|---|---|---|---|---|---|
| Run No. | Reductant Feed Ratio* | Chemical Utilization of $CO + H_2$, %** | Carbon Content of Calcine, % | % Reduction | % Leachability Cu | % Leachability Ni |
| 47 | 0.64 | 61 | .05/.07 | 77 | 94/91 | 92/86 |
| 51 | 0.73 | 53 | .06/.11 | 78 | 91/89 | 90/88 |
| 53 | 0.64 | 62 | .06/.04 | 78 | 91/95 | 90/89 |
| 54 | 0.62 | 63 | .12/.12 | 77 | 91/91 | 92/85 |
| Comm. Flow-sheet | 0.69 | 72 | — | — | 90 | 90 |

*Lb-moles equivalent ($CO + H_2$)/100 lb equivalent bone-dry feed;
**(Lb-atoms oxygen liberated/100 lb bone-dry feed)/(Reductant feed ratio);
Note:
Where two numbers are given, the first refers to underflow calcine, the second to cyclone calcine.

Table II

| | | Condensed Summary of Calcination Data | | |
|---|---|---|---|---|
| Run No. | Reactor Dia. | $O_2$ Content of offgas, vol. % | Carbon Content of Calcine % | Mn(IV)/Mn ratio in calcine |
| 47 | 4 in. | 1.4 | .04/.01 | 0.38 |
| 51 | 4 in. | 0.4 | .04/.09 | 0.40 |
| 53 | 4 in. | 6.0 | .05/.04 | 0.41 |
| 54 | 12 in. | 6.5 | .02/.03 | 0.39 |
| Comm Flow-Sheet | 40 ft. | 6.0 | — | 0.5 |

Note:
Where two numbers are given, the first refers to underflow, the second to cyclone calcine.

Reduction tests were performed in a 4 in. diameter fluid bed reactor of similar design to the fluid bed reactor shown in FIG. 5.

Reduction (stage 2) results demonstrate that 6-mesh calcined feed can be reduced using a one-hour retention time and a reductant feed ratio of 0.62 lb-moles ($CO + H_2$)/100 lb of bone-dry feed.

The primary manganese products of reduction were MnO and $Mn_2SiO_4$. Tentative identifications were also made for trace amounts of MnS, $Mn_2O_3$ and/or $Fe_2O_3$, and MnOOH and/or FeOOH (cyclone sample only). A suspected Cu-Ni alloy was always found; metallic iron was never detected.

Figure 6:
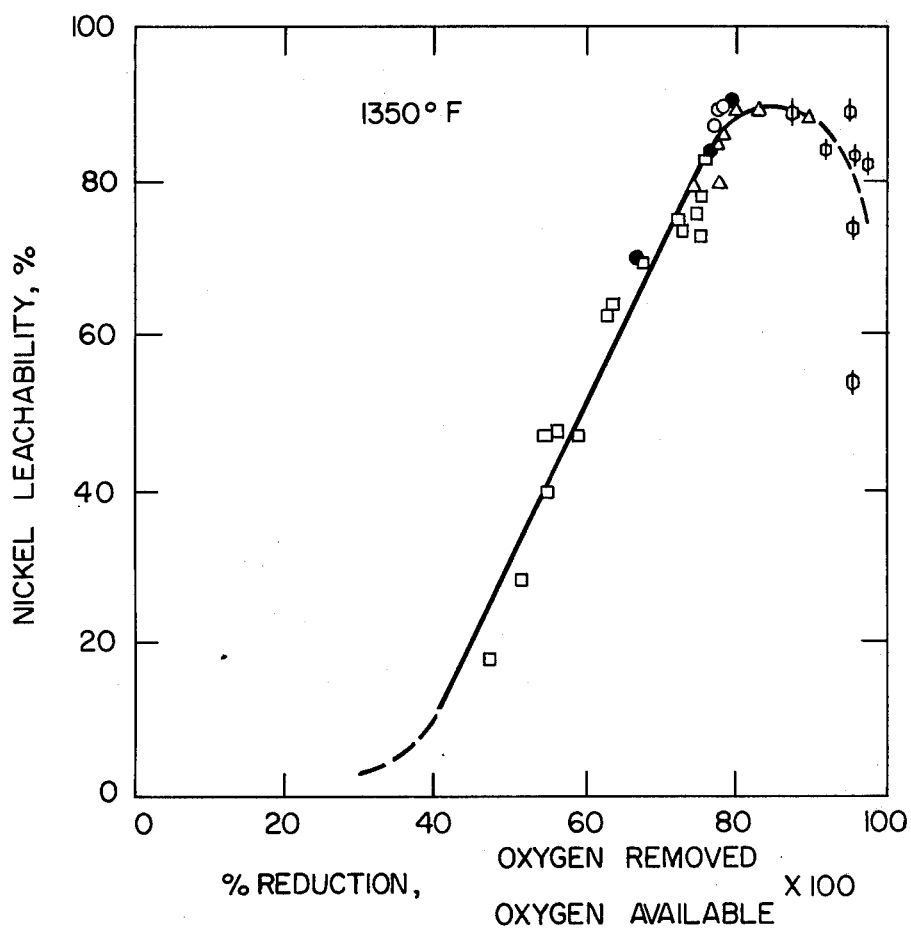
FIG. 6 is a graph showing extent of reduction on nickel leachability.

Several calcines were deliberately over-reduced by operating the reactor batch-wise with a sufficiently rich gas to reduce the calcine beyond FeO. (A $CO/CO_2$ ratio greater than 1.6 is required at 1350° F). These tests (also FIG. 6) suggest that over-reduction impairs nickel leachability and that an optimum level of reduction exists between 75 and 85%.

Calcining and reduction test data summaries appear in Tables B-I to B-VII below.

TABLE B-1

| | | | | | | | | | | | | | | | |
|---|---|---|---|---|---|---|---|---|---|---|---|---|---|---|---|
| | | | | | | Summary of Run Conditions for Calcining Runs (Stage 1) | | | | | | | | | |
| Run No. | Bed Temp. (°F) | Free-board Temp. (°F) | Solids Feed (lb.b.d. ore/min) | Oil Rate (lb. oil/lb. b.d. ore) | Water Content of Ore. % | Air Rate (scfm/100 lb.b.d. ore) | Space Vel. (ft./sec) | Aver. Retention Time (min) | Bed Density (lb/ft³) | $O_2$ | $H_2$ | $H_2O$ | CO | $CO_2$ | Hydrocarbons | Carry over (%) |
| 47-1 | 1350 | 1270 | 0.282 | .0583 | 13 | 850 | 2.4 | 93 | 50 | 1 | 0 | 34 | 0 | 12 | 0 | 45 |
| 51-1 | 1390 | 1190 | 0.609 | .0600 | 20 | 820 | 6.2 | 38 | 49 | 0 | 0 | 44 | 0 | 11 | 0 | 38 |
| 53-1 | 1355 | 1230 | 0.269 | .0659 | 15 | 1650 | 3.7 | 113 | 50 | 5 | 0 | 24 | 0 | 7 | 0 | 55 |
| | 1355 | 1230 | 0.269 | .0669 | 15 | 1650 | 3.8 | 113 | 50 | 7 | 0 | 23 | 0 | 8 | 0 | (55) |
| 54-1 | 1365 | 1250 | 2.36 | .0760 | 14 | 1697 | 3.8 | 167 | 56 | 6 | 0 | 23 | 0 | 8 | 0 | 52 |

Note:
Bed height was 4 ft for Run 54-1, 3 ft for all other runs.

TABLE B-II

| | Summary of Data Evaluation for Calcining Runs | | | | |
|---|---|---|---|---|---|
| | | | (Stage 2) | | |
| Run No. | Carbon Content of Calcine (%) | Mn (IV) of Calcine (%) | Ratio Mn (IV) Mn in Calcine | % Reduction | Comments |
| 47-1 | 0.04/0.01 | 13/12 | .38/.37 | 37 | −10 mesh feed |
| 51-1 | 0.04/0.09 | 12/14 | .38/.43 | 31 | 6 mesh feed |
| 53-1 | 0.05/0.04 | 12/14 | .40/.42 | 42 | 6 mesh feed, two day operation |
| | — | 12/14 | | | |
| 54-1 | 0.02/0.03 | 15/13 | .39/.40 | 36 | 12" dia. reactor |

Notes:
(1) Where two numbers are given, the first refers to Underflow, the second to Cyclone Calcine.
(2) Four inch diameter reactor except where noted otherwise.

TABLE B-III

Summary of Run Conditions for Stage II (Reduction) Simulation Runs
Feed Gas

TABLE B-III-continued

| Run No. | Bed Temp. (°F) | Solids+ Feed + (lb.b.d. ore/min) | Water Content Ore Feed (%) | Rate (scfm/100 lb.b.d. ore) | Composition*** (vol. %) | | | | | Equiv. Reductant Feed Ratio** Lb-Moles (CO+$H_2$)/100 Lb b.d. Ore |
|---|---|---|---|---|---|---|---|---|---|---|
| | | | | | $H_2$ | CO | $CO_2$ | $H_2O$ | $H_2S$ | |
| 47-11 | 1340 | 0.936+ | 2 | 340 | 38 | 42 | 8 | 0 | 0 | 0.0.64 |
| 51-11 | 1350 | 0.506+†+ | 2 | 1540 | 15 | 17 | 21 | 0 | 0 | 0.0.73 |
| 53-11 | 1350 | 0.700+†+†+λ | 3 | 740 | 30 | 22 | 14 | 22 | 0.1 | 0.0.64 |
| 54-11 | 1330 | ++ 0.673 | 6 | 830 | 28 | 20 | 20 | 20 | 0.3 | 0.62 |

| Run No. | Space Vel. (ft/sec) | Average Rentention Time (min) | Bed Depth (ft) | Bed Density (lb/cu ft) | Carry-over (%) | Off Gas Composition (Vol. %) | | | |
|---|---|---|---|---|---|---|---|---|---|
| | | | | | | $P_2$ | $H_2O$ | CO | $CO_2$ |
| 47-11 | 2.4 | 51 | 4 | 53 | 57 | (17) | (28) | (13) | (30) |
| 51-11 | 5.4 | 72 | 3 | 46 | 62 | 8(8) | 10(9) | 14(14) | 24(2) |
| 53-11 | 3.8 | 51 | 3 | 50 | 59 | 6(20) | 68(37) | 3(9) | 8(21) |
| 54-11 | 4.1 | 65 | 3 | 51 | 67 | 12(18) | 45(38) | 10(9) | 23(2) |

+ Feed prepared by blending calcination product and other materials, as defined in Table B-V.
*Numbers in parentheses are calculated from material balance, assuming water-gas shift equilibria at reaction temperature.
**See Glossary (pp.6+7) for defintion.
***Balance nitrogen.

TABLE B-IV

Summary of Data Evaluation for Stage II (Reduction) Simulation Runs

| Run No. | Carbon Content of Calcine (%) | Chemical Utilization of CO+$H_2$, % ** | Overall % Reduction | Leachability, % | | | Comments |
|---|---|---|---|---|---|---|---|
| | | | | Cu | Ni | Co | |
| 47-11 | .05/.07 | 61 | 77 | 94/91 | 92/86 | 64/54 | 10 mesh feed |
| 51-11 | .06/.11 | 53 | 78 | 91/89 | 90/88 | 70/69 | 6 mesh feed |
| 53-11 | .06/.04 | 62 | 78 | 91/95 | 90/89 | 56/51 | 6 mesh feed; significant errors in off gas analysis |
| 54-11 | .12/.12 | 63 | 77 | 91/91 | 92/85 | 78/84 | 6 mesh feed |

Notes:
(1) Where two numbers are given, the first refers to Underflow, the second to Cyclone Calcine.
(2) Negative figure for % Mn (IV) denotes % excess Fe(II).
** See Glossary (pp.6+7) for definition.

TABLE B-VI

Additional Data for Calcining Run 54

Reactor Diameter - 12 in.
Bed Density Based on Pressure Drop - 56 lb/cu ft
Bed Density Based on Final Bed Weight - 47 lb/cu ft Product Distribution, %

| | |
|---|---|
| Underflow | 47.6 |
| Primary Cyclone | 46.1 |
| Secondary Cyclone | 4.6 |
| Scrubber Fines | 1.7 |

Available Oxygen Content, %

| | |
|---|---|
| Feed | 11.9 |
| Underflow | 9.3 |
| Primary Cyclone | 9.3 |
| Secondary Cyclone | 9.2 |

TABLE B-VII

Additional Data for Reduction Run 54

Reactor Diameter - 4 in.
Bed Density Based on Pressure Drop - 51 lb/cu ft

Product Distribution, %

| | |
|---|---|
| Underflow | 32.6 |
| Cyclone | 63.3 |
| Scrubbed Dust | 4.1 |

Available Oxygen Content, %

| | |
|---|---|
| Feed (dry basis) | 9.6 |
| Underflow | 2.8 |
| Cyclone | 3.9 |

Leachability of Scrubbed Fines, %

| | |
|---|---|
| Copper | 63 |
| Nickel | 20 |
| Cobalt | 24 |

As is apparent from the foregoing, the primary object of the present invention is to reduce nodules in a manner that is more economical than known prior art processes. To accomplish this object, the nodules are first calcined and then reduced. Calcination is performed at a temperature between the range of 1150° F to 1400° F. The preferred temperature, however, is about 1350° F. The lower end of the temperature range is determined by the efficiency by which the oil utilized to perform the calcination can be combusted. In order to enable the oil to burn in the fluid bed efficiently, the temperature must be about approximately 1150° C. Therefore the reason for the lower temperature unit is apparent. However, there is no advantage in operating the calciner above 1400° F. Indeed, operating above 1400° F only increases the fuel requirements.

When the nodules are pre-dried prior to entering the calciner, it has been found advantageous to dry them at a temperature between the range of 200° - 300° F.

The temperature in the reducer is maintained between the range of 1200° - 1500° F. The preferred temperature is about 1350° F. The upper temperature range in the reducer (1500° F) is controlled by the fact that nickel leachability is poor when reduction is carried out at a temperature higher than 1500° F. By operating the calciner and the reducer within the temperature ranges set forth above, the nodules are reduced; thus, enabling the metal values contained therein to be leached.

Indeed the test work verified the basic objectives in the process. Extractions of 90% copper, 90% nickel, and 60% cobalt were demonstrated by leaching underflow and cyclone recovered carryover products with aqueous ammonia-ammonium carbonate solutions. Carbon deposition was negligible, and metal losses such as by volatilization were not detected within the limits of experimental error. Carbon formation in the process is minimized by maintaining 6% oxygen in the stack gases and there was no evidence of significant formation of carbon in the calciner or reducer beds. The carbon content of underflow and cyclone calcines was 0.12% or less although scrubber fines from the offgas contained about 5% carbon. Decrepitation of nodule ore was high but not excessive; no tendency toward agglomeration was evident. Carryover ducts not collected by cyclones were recovered by wet scrubbing, and solid-liquid separation tests were made on the resulting slurries. The results of tests were that the fines could be recovered by conventional clarification and filtration techniques. Scrubbed reducer fines leached approximately 60% copper, 20% nickel, and 20% cobalt.

In the foregoing description, the reduced nodules are cooled prior to direct quenching in the leach liquor. The reason for this fact is that in conventional high temperature reduction of ore followed by leaching, direct quenching is detrimental to ultimate metals extraction. However, with the process of the present invention, it has been found that the nodules leaving the reducer can be quenched directly in a leach liquor. Of course, direct quenching results in a savings in capital expenses and in operation costs, since it eliminates the need for a cooling unit.

In this embodiment of the invention, the nodules leaving the reducer are dumped into a stirred tank containing leach liquor. For example, the ground nodules were gas reduced in a fluid bed at 1350° F. They were allowed to cool to 800° F and were then dropped directly into aqueous liquor containing approximately 7 g/l Cu and Ni, 106 g/l $NH_3$ and 86 g/l $CO_2$. The temperature of the leach liquor was approximately 100° F. Extractions obtained were 98% copper, 91% nickel, and 56% cobalt.

The invention may be embodied in other specific forms without departing from the spirit or essential characteristics thereof. The present embodiments are therefore to be considred in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for reducing $MnO_2$ in a manganese ore containing base metal values to enable the base metal values in the ore to be leached comprising the steps of:
    a. introducing the ore into a fluid bed drier and drying the ore in the drier at a temperature between the range of 200°-300° F for a period of time sufficient to liberate free moisture from the ore producing an off gas from which scrubber fines can be recovered in a scrubber;
    b. introducing the ore dried in step (a) into a fluid bed calciner and calcining the ore under a neutral or oxidizing atmosphere to convert the $MnO_2$ in the ore to intermediate oxides of manganese producing an off gas from which scrubber fines can be recovered in a scrubber;
    c. delivering the ore calcined in step (b) from the fluid bed calciner into a fluid bed reducer and reducing the intermediate oxides of manganese in the ore to MnO at a temperature between the range of 1200°-1500° F in the fluid bed reducer; and,
    d. forwarding scrubber fines recovered from the off gases from the fluid bed dryer and fluid bed calciner directly to the fluid bed reducer to enable the temperature at which the ore is reduced in step (c) to be maintained between the range of 1200°-1500° F.

2. The process as set forth in claim 1 wherein in step (c) the ore is reduced with a gas selected from the group consisting of synthesis gas, a gas containing carbon monoxide and hydrogen, a gas prepared by the partial oxidation of oil with oxygen enriched air and a gas prepared by the partial oxidation of Bunker C oil with oxygen enriched air.

3. The process as set forth in claim 1 wherein combined moisture is removed from the ore during the calcining of step (b), any free moisture remaining in the ore after being dried in step (a) is removed with the combined moisture in step (b) and 0.7 lbs atoms of oxygen per 100 lbs. bone-dry ore is removed from the ore during the calcination of step (b) and the reduction of step (c).

4. The process as set forth in claim 2 wherein the reduced ore is leached and metal values are recovered from the pregnant leach liquor by a liquid ion exchange reactant.

5. The process as set forth in claim 2 wherein the reduced calcine is dropped directly into an aqueous leach liquor containing ammonia and carbon dioxide.

6. The process as set forth in claim 4 wherein the reduced calcine is cooled to about 500° F and is subsequently added to the leach liquor.

7. The process as set forth in claim 6 wherein the reduced calcine is cooled in a fluid bed cooler.

8. The process as set forth in claim 7 wherein the leach liquor to which the reduced nodules are added is wet ground and is subsequently introduced into a mixed leaching tank into which oxygen is added.

9. The process as set forth in claim 8 wherein pregnant liquor is separated from the slurry and wherein a portion of the pregnant liquor is recycled and used to grind the reduced nodules.

10. The process as set forth in claim 9 wherein the pregnant liquor is separated from the slurry in a first stage leach thickener tank and the slurry, after separation from the pregnant liquor, is flowed to a second stage leach in which the slurry is oxidized and is subsequently separated with the liquid being recycled to the first stage leach thickener tank and the solids are flowed to a wash system and a portion of the pregnant liquor from the first stage leach thickener is directed to liquid ion exchange treatment for recovery of metal values.

11. The process as set forth in claim 10 wherein the slurry is washed in a counter-current decantation wash system and the wash effluent is flowed to the second stage leach.

12. A process for reducing $MnO_2$ in a manganese ore containing base metal values to enable the base metal values in the ore to be leached comprising the steps of:
    a. introducing the ore into a fluid bed drier and drying the ore in the drier at a temperature between the range of 200°-300° F for a period of time sufficient to liberate free moisture from the ore;
    b. introducing the ore dried in step (a) into a fluid bed calciner and calcining the ore under a neutral or oxidizing atmosphere to convert the $MnO_2$ in the ore to intermediate oxides of manganese;
    c. delivering the ore calcined in step (b) from the fluid bed calciner into a fluid bed reducer and reducing the intermediate oxides of manganese in the ore to MnO in the fluid bed reducer at a temperature between the range of 1200°–1500° F; and, d. passing a portion of the dryer product directly to the fluid bed reducer to enable the temperature at which the ore is reduced in step (c) to be maintained at a temperature between the range of 1200°–1500° F.

13. The process as set forth in claim 12 wherein in step (c) the ore is reduced with a gas selected from the group consisting of synthesis gas, a gas containing carbon monoxide and hydrogen, a gas prepared by the partial oxidation of oil with oxygen enriched air and a gas prepared by the partial oxidation of Bunker C oil with oxygen enriched air.

14. The process as set forth in claim 12 wherein combined moisture is removed from the ore during the calcining of step (b), any free moisture remaining in the ore after being dried in step (a) is removed with the combined moisture in step (b) and 0.7 lbs. atoms of oxygen per 100 lbs. bone-dry ore is removed from the ore during the calcination of step (b) and the reduction of step (c).

15. A process for reducing $MnO_2$ in a manganese ore containing copper and nickel base metal values to enable the copper and nickel base metal values in the ore to be leached comprising the steps of:

a. grinding the ore;

b. drying the ground ore to remove free moisture;

c. calcining the ground, dried ore in a fluid bed calciner under a neutral or oxidizing atmosphere to remove remaining free moisture and combined moisture and to convert the $MnO_2$ in the ore to intermediate oxides of manganese producing an off gas from which scrubber fines can be recovered in a scrubber;

d. delivering the ore, calcined in step (c) to a fluid bed reducer and reducing the ground, dried, calcined ore at a temperature between the range of 1200°–1500° F to convert the oxides of manganese in the ore to MnO; and, e. forwarding scrubber fines recovered from the off gases from the fluid bed calciner directly to the fluid bed reducer to enable the temperature at which the ore is reduced to be maintained between the range of 1200–1500° F.

16. The process as set forth in claim 15 wherein in step (b) the ground ore is dried in a fluid bed dryer at a temperature between the range of 200°–300° F and the scrubber fines from the fluid bed dryer are forwarded to the fluid bed reducer to enable the temperature at which the ore is reduced in the fluid bed reducer to be maintained at the range of 1200°–1500° F.

17. The process as set forth in claim 15 wherein in step (c) the ground dried ore is calcined at a temperature between the range of 1150°–1400° F.

18. The process as set forth in claim 17 wherein in step (c) the ground dried ore is calcined at a temperature of approximately 1350° F.

19. The process as set forth in claim 15 wherein in step (d) the ground dried calcined ore is reduced at a temperature of about 1350° F.

20. The process as set forth in claim 15 wherein in step (c) the ground dried ore is calcined in a fluid bed calciner by directly injecting and combusting fuel oil.

21. The process as set forth in claim 15 wherein in step (c) the ground, dried, ore is calcined in a fluid bed calciner by directly injecting and combusting Bunker C fuel oil.

22. The process as set forth in claim 21 wherein the fuel oil is combusted with an amount of air sufficient to maintain an oxygen content of 6% by weight in the stack gases.

23. The process as set forth in claim 15 wherein the calcined product of step (c) is transmitted to the fluid bed reducer of step (d) as underflow and wherein the carry over from the calcining step (c) is removed from the off gases and is added to the calciner underflow.

24. The process as set forth in claim 23 wherein the solid carry over is removed from the off gases by passing the off gases through a cyclone.

25. The process as set forth in claim 15 wherein the copper and nickel values are reduced to their elemental state in step (d).

26. The process as set forth in claim 25 wherein in step (d) the ground, dried, calcined ore is reduced with a gas containing carbon monoxide and hydrogen.

27. The process as set forth in claim 26 including the step of cooling the ore that is reduced in step (d) in a two-stage fluid bed.

28. The process as set forth in claim 15 wherein the ore that is reduced in step (d) is introduced into an ammonia-ammonium carbonate leach solution.

29. The process as set forth in claim 28 including the step of oxidizing the copper and nickel values prior to dissolution in the leach solution.

30. The process as set forth in claim 29 including the step of extracting the copper and nickel values with an ion exchange extractant.

31. A process for recovering metal values selected from the group consisting of copper and nickel from a manganese ore containing copper and nickel base metal values comprising the steps of:

a. drying the ore in a fluid bed dryer to remove free moisture from the ore producing an off gas from which scrubber fines can be recovered in a scrubber;

b. calcining the dried ore in a fluid bed calciner under a neutral or oxidizing atmosphere to remove remaining free moisture and combined moisture and to convert $MnO_2$ in the ore to intermediate oxides of manganese producing an off gas from which scrubber fines can be recovered in a scrubber;

c. delivering the calcined ore to a fluid bed reducer and reducing the calcined ore in the fluid bed at a temperature between the range of 1200°–1500° F to convert the oxides of the manganese in the ore to MnO;

d. forwarding scrubber fines recovered from the off gases from the fluid bed dryer and fluid bed calciner directly to the fluid bed reducer to enable the temperature in which the ore is reduced in step (c) to be maintained between the range of 1200°–1500° F;

e. introducing the ore reduced in steps (c) and (d) into an ammonium carbonate leach solution and oxidizing the copper and nickel values prior to dissolution in the leach solution to produce a pregnant leach liquor containing copper and nickel values; and, f. recovering metal values from pregnant leach liquor.

32. The process as set forth in claim 31 wherein the metal is recovered from the pregnant leach liquor by a liquid ion exchange reactant.

33. The process as set forth in claim 31 wherein the reduced calcine is dropped directly into an aqueous leach liquor containing ammonia and carbon dioxide.

34. The process as set forth in claim 31 wherein the reduced calcine is cooled to about 500° F and is subsequently added to the leach liquor.

35. The process as set forth in claim 34 wherein the reduced calcine is cooled in a fluid bed cooler.

36. The process as set forth in claim 31 wherein the reduced nodules are wet ground in pregnant leach liquor and are subsequently introduced into a leaching tank.

37. The process as set forth in claim 36 wherein pregnant liquor is separated from the slurry and wherein a portion of the pregnant liquor is recycled and used to grind the reduced nodules.

38. The process as set forth in claim 37 wherein the pregnant liquor is separated from the slurry in a first stage leach thickener tank and the slurry, after separation from the pregnant liquor, is flowed to a second stage leach in which the slurry is oxidized and is subsequently separated with the liquid being recycled to the first stage leach thickener tank and the solids are flowed to a wash system and a portion of the pregnant liquor from the first stage leach thickener is directed to liquid ion exchange treatment for recovery of metal values.

39. The process as set forth in claim 38 wherein the slurry is washed in a counter-current decantation wash system and the wash effluent is flowed to the second stage leach.

40. A process for recovering metal values selected from the group consisting of copper and nickel from a manganese ore containing copper and nickel base metal values comprising the steps of:
 a. drying the ore to remove free moisture;
 b. calcining the dried ore in a fluid bed calciner under a neutral or oxidizing atmosphere to remove remaining free moisture and combined moisture and to convert $MnO_2$ in the ore to intermediate oxides of manganese;
 c. delivering the calcined ore to a fluid bed reducer and reducing the calcined ore in the fluid bed at a temperature between the range of 1200°–1500° F to convert the oxides of manganese in the ore to MnO;
 d. passing a portion of the dryer product directly to the fluid bed reducer to enable the temperature at which the ore is reduced in step (c) to be maintained at a temperature between the range of 1200°–1500° F;
 e. introducing the ore reduced in step (c) and (d) into an ammonium carbonate leach solution and oxidizing the copper and nickel values prior to dissolution in the leach solution to produce a pregnant leach liquor containing copper and nickel values; and,
 f. recovering metal values from the pregnant leach liquor.

41. The process as set forth in claim 40 wherein the metal is recovered from the pregnant leach liquor by a liquid ion exchange reactant.

42. The process as set forth in claim 40 wherein the reduced calcine is dropped directly into an aqueous leach liquor containing ammonia and carbon dioxide.

43. The process as set forth in claim 40 wherein the reduced calcine is cooled to about 500° F and is subsequently added to the leach liquor.

44. The process as set forth in claim 43 wherein the reduced calcine is cooled in a fluid bed cooler.

45. The process as set forth in claim 44 wherein the leach liquor to which the reduced nodules are added is wet ground and is subsequently introduced into a mixed leaching tank into which oxygen is added.

46. The process as set forth in claim 45 wherein pregnant liquor is separated from the slurry and wherein a portion of the pregnant liquor is recycled and used to grind the reduced nodules.

47. The process as set forth in claim 46 wherein the pregnant liquor is separated from the slurry in a first stage leach thickener tank and the slurry, after separation from the pregnant liquor, is flowed to a second stage leach in which the slurry is oxidized and is subsequently separated with the liquid being recycled to the first stage leach thickener tank and the solids are flowed to a wash system and a portion of the pregnant liquor from the first stage leach thickener is directed to liquid ion exchange treatment for recovery of metal values.

48. The process as set forth in claim 47 wherein the slurry is washed in a counter-current decantation wash system and the wash effluent is flowed to the second stage leach.

* * * * *